Patented Nov. 16, 1926.

1,607,364

UNITED STATES PATENT OFFICE.

JOSEPH L. RAFFETTO, OF NEW YORK, N. Y., ASSIGNOR TO G. B. RAFFETTO, INC., OF NEW YORK, N. Y., A CORPORATION OF NEW YORK.

METHOD OF PRESERVING FRUIT.

No Drawing. Application filed September 23, 1925. Serial No. 58,015.

This invention is a method of making jellied fruits in connection with brandy, or analogous agent, and has for its object several important advantages, among which may be mentioned the following: First, the product, in pronounced contradistinction from prior so-called "brandy preserves", is entirely free from liquidity; that is to say, it is substantially solid, and, when withdrawn from its container, substantially retains its form or shape as a unitary mass; second, the jellied fruit need not be heated, to effect sterilization, to any such extent as has heretofore been the practice for the reason that the brandy and gelatine employed exert a joint preservative effect on the fruit, and, moreover, the solidity of the product precludes undue exposure of the fruit to air; third, the fact that the fruit may be efficiently preserved with less heating as described, results in a preserved fruit which is firmer, i. e., less disintegrated, than has been the case heretofore; fourth, the product, because of such lack of extended heating, retains its natural color, aroma and taste almost perfectly; fifth, the completed brandied and jellied product, due to a pronounced extent to the gelatine or pectin employed to effect solidity, is particularly nutritious and of high calorific value, and, sixth, the attractive eye appearance of the product imparts to it a pronounced and distinctive zest not inherent in the preserved fruits of the prior art.

Features and advantages of the invention, other than those adverted to, will be apparent to those skilled in the art, and, more particularly, from the following detailed description of the preferred method of practicing the invention.

In practically carrying out the invention, I prefer to proceed in substantially the following way, using substantially, the proportions of materials or ingredients specified, though it will be understood that slight modifications may be made, both as regards procedure and proportions of ingredients, without departing from the spirit or substance of the invention.

I take twelve (12) liquid ounces of a mixture consisting of syrup of a strength of approximately 32 degrees Baumé and about three (3) ounces of apple or fruit pectin; one and one-quarter pints (1¼) of the fruit to be jellied and a sufficient quantity of brandy of such proof as to give, approximately, three (3) to four (4) ounces of alcohol by volume in a quart jar of the finished jellied product. Gelatine may, if desired, be used to replace the pectin in whole or in part.

The ingredients may be combined in various ways such as by adding the fruit to the syrup, heating to the desired extent to effect sterilization, whereupon the pectin or gelatine, or a mixture thereof is admixed with the hot syrup and fruit, and after the mass has become homogeneous and uniformly mixed (and cooled, if deemed advisable), the brandy is added and properly incorporated with the other ingredients and the mixture thereupon bottled or canned as customarily. If preferred, the pectin or gelatine may be uniformly mixed with the syrup, prior to adding the fruit, or the pectin and gelatine, or mixture thereof, may be added to the syrup simultaneously with the fruit. It will be understood, also, that any mixture of fruits, two or more, may be used if desired.

Having thus fully described the invention, what I claim as new and desire to secure by Letters Patent is:

1. The process of producing substantially solid non-disintegrated, jellied fruits which consists in sterilizing the fruit, mixing it with a jellifying agent containing pectin, and adding brandy thereto, all in such proportions as to produce solid jellied fruits.

2. The process of producing substantially solid, jellied fruits which consists in sterlizing the fruit, treating it with a jellifying agent consisting of pectin and gelatine in such proportions, with reference to the fruit, as to produce, when cold, a substantially solid non-disintegrated product and, prior to cooling, adding brandy thereto as a preserving agent.

3. The process of producing substantially solid, jellied fruits which consists in heating without disintegrating the fruit in a syrup, adding apple pectin thereto so as to produce, when cold, a substantially solid product, and then adding an alcoholic agent as a preservative.

In testimony whereof I have signed the foregoing specification.

JOSEPH L. RAFFETTO.